(12) United States Patent
Van Den Dungen et al.

(10) Patent No.: US 7,357,953 B1
(45) Date of Patent: Apr. 15, 2008

(54) METHOD FOR MANUFACTURING SAUSAGES, AND CONTAINER FOR CONTAINING SAUSAGES TO BE PROCESSED

(75) Inventors: Wilhelmus Johannes Everardus Maria Van Den Dungen, Veghel (NL); Antonius Joseph Henricus Aloysius Van Liebergen, Megen (NL)

(73) Assignee: Stork Townsend Inc., Des Moines, IA (US)

( * ) Notice: Subject to any disclaimer, the term of this patent is extended or adjusted under 35 U.S.C. 154(b) by 1112 days.

(21) Appl. No.: 10/130,618

(22) PCT Filed: Nov. 14, 2000

(86) PCT No.: PCT/NL00/00830

§ 371 (c)(1),
(2), (4) Date: Aug. 5, 2002

(87) PCT Pub. No.: WO01/35752

PCT Pub. Date: May 25, 2001

(30) Foreign Application Priority Data

Nov. 17, 1999 (NL) .................................... 1013596

(51) Int. Cl.
*A22C 11/00* (2006.01)
(52) U.S. Cl. ...................... 426/465; 426/641; 426/516; 426/520; 99/443 C; 99/448; 99/467; 99/483; 452/30; 452/51
(58) Field of Classification Search .................. 99/467, 99/483, 443 C, 448; 426/105, 465, 520, 426/92, 138, 443, 516, 641; 452/30, 31, 452/51, 177–184, 194
See application file for complete search history.

(56) References Cited

U.S. PATENT DOCUMENTS

| | | | | |
|---|---|---|---|---|
| 3,117,869 A | * | 1/1964 | Sims | 426/413 |
| 3,615,585 A | * | 10/1971 | Clemens | 426/465 |
| 3,709,142 A | * | 1/1973 | Peterson | 99/357 |
| 3,770,459 A | * | 11/1973 | Gast | 426/8 |
| 3,802,832 A | * | 4/1974 | Nicolaus | 432/128 |
| 4,058,633 A | * | 11/1977 | Staff et al. | 426/315 |
| 4,548,130 A | * | 10/1985 | Diener et al. | 99/345 |
| 4,646,629 A | * | 3/1987 | Creed et al. | 99/468 |
| 4,997,663 A | * | 3/1991 | Potthast | 426/241 |
| 5,398,600 A | * | 3/1995 | Madsen et al. | 99/477 |
| 5,759,602 A | * | 6/1998 | Kobussen et al. | 426/241 |

(Continued)

FOREIGN PATENT DOCUMENTS

DE          1023308        * 1/1958

(Continued)

*Primary Examiner*—Drew Becker

(57) ABSTRACT

The invention relates to a method for manufacturing dry sausages by the successive processing steps of: A) manufacturing a half-finished product which is still to be dried and consists of a skin filled with a sausage filling, and B) drying the half-finished product for a period of more than one day, wherein the half-finished products are moved, optionally intermittently, during drying. The invention also relates to an apparatus for manufacturing dry sausages, comprising means for manufacturing half-finished products consisting of a skin filled with a sausage filling still to be dried, and a container for drying a plurality of half-finished products for dry sausages in a drying space with a frame in which at least one endless conveyor is arranged, which conveyor is provided with a plurality of product carriers and wherein the conveyor with product carriers is displaceable relative to the frame.

20 Claims, 3 Drawing Sheets

Figure 1:
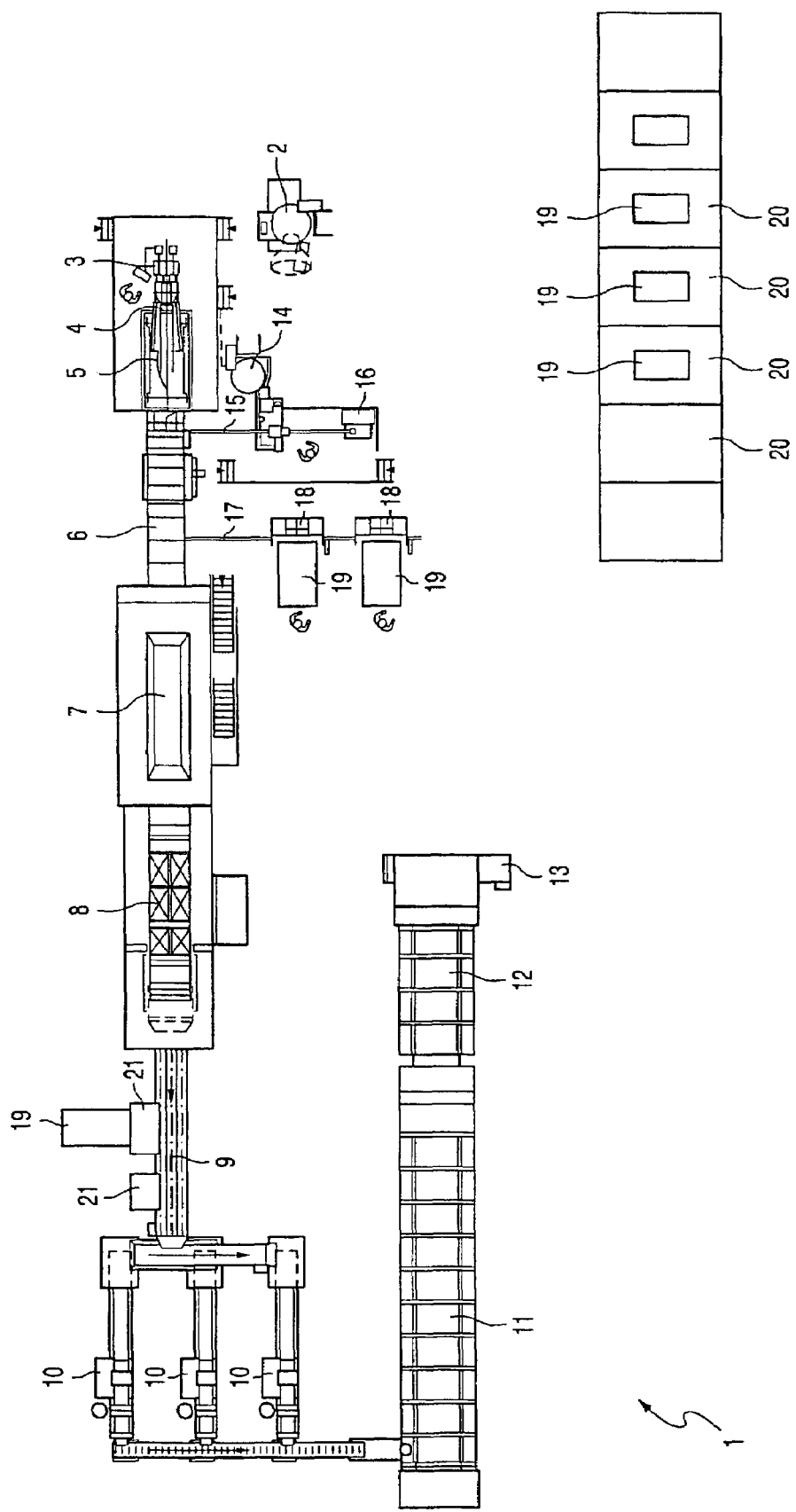

U.S. PATENT DOCUMENTS 6,277,018 B1 * 8/2001 Cody et al. .................... 452/51
6,336,397 B1 * 1/2002 Michel et al. ................. 99/427
6,419,968 B1 * 7/2002 Wang et al. ................. 426/277

FOREIGN PATENT DOCUMENTS

| | | | |
|---|---|---|---|
| DE | 19507578 | * | 9/1996 |
| GB | 1547906 | * | 6/1979 |
| NL | 265896 | * | 7/1964 |
| SU | 1099935 | * | 6/1984 |
| WO | WO 99/13729 | * | 9/1997 |
| WO | WO 01/89326 A1 | * | 11/2001 |

* cited by examiner

METHOD FOR MANUFACTURING SAUSAGES, AND CONTAINER FOR CONTAINING SAUSAGES TO BE PROCESSED

The invention relates to a method for manufacturing sausages by the successive processing steps of: A manufacturing a half-finished product which is still to be pre-dried and consists of a skin filled with a sausage filling, and B pre-drying the half-finished product. The invention also relates to an apparatus for manufacturing sausages, comprising: means for manufacturing pre-dried products consisting of a skin filled with a sausage filling comprising a co-extrusion unit and a pre-drying unit, and to a container for applying the method.

Sausages are also subdivided into inter alia the classes of cooked sausages and dry sausages. Cooked sausages are also known as smoked sausages, frankfurter sausages, "Gelderland" sausages, and so on. Dry sausage must be dried for a longer period of time and undergoes herein a fermentation process wherein on the one hand sugars are converted into acids by means of micro-organisms so that the pH value of the sausage falls. On the other hand the water activity decreases, which results among other things in a preserving effect. The drying process generally requires two to fourteen days, but can even last for months in particular situations, such as for instance in the drying of sausages which are provided with a fungus. Drying usually takes place at a temperature of 20 to 30° C. According to the prior art the half-finished products for dry sausages are suspended in a climate room in order to thus undergo the drying process. The half-finished products for dry sausages consist of sausage dough which is placed in a natural intestine or a preformed skin of collagen or cellulose. The drawback of this existing method is that the drying of sausages is not a fully controlled process. In addition, it is relatively labour-intensive to suspend the half-finished products, move them in and out of a climate room and unfasten the dried sausages. The international patent application WO 99/13729 discloses a transporting device for food products that can produce cooked or smoked sausages as described above. This device can not produce dry sausages; after producing a pre-dried product with the device the pre-dried product (sausage) has to be moved to a drying room for the final drying process.

The present invention has for its object to provide a method and apparatus whereby the drying process for dry sausages can be performed in more controlled and efficient manner so that these sausages can be manufactured more cheaply and in simpler manner with a uniform end product than the manual method of hanging the sausages in a processing room.

The invention provides for this purpose a method of the type stated in the preamble, characterized in that, the sausages to be manufactured are dry sausages, the half-finished pre-dried product is dried for a second time during a period of more than one day, and the products are moved, optionally intermittently, during the second drying. The half-finished products can herein be moved such that the orientation changes and/or that they are displaced. Moving of the half-finished products can take place at optionally regular time intervals, but continuous displacement/change of orientation of the sausages is also a possibility. Displacement with or without change of orientation of the sausages during second drying has the advantage that second drying can take place more uniformly. When the sausages are dried for a second time in conventional manner they are suspended in stationary manner in a drying space/climate room with an atmosphere which is not completely homogenous. The temperature and the air humidity will not be the same everywhere in the space. This leads to a non-homogenous drying result which influences the fermentation process and thus the taste, shelf life and other quality aspects of the sausage. It is recommended that all half-finished products cover the same path through the climate room so that all half-finished products are subjected to substantially the same process conditions, the result of which is a virtually homogenous second drying and therefore a virtually constant quality. Yet another advantage of displacement, with or without change of orientation, of half-finished products for second drying is that the second drying can be shortened relative to the stationary suspended drying of sausage strings, since the sausages dry evenly over more or less the whole of their surface and the remaining water is evenly distributed in the sausage. Yet another advantage of the method according to the invention relative to the stationary suspended second drying of sausages is that the sausages can be prevented from deforming to a greater or lesser extent during drying so that the final form of a dried sausage is not completely controllable and symmetrical. Furthermore, the chance of marks remaining on the sausages as a result of the drying is considerably reduced.

The French patent FR-A-1 360 422 discloses a device and a method to produce dry sausages without a skin. The sausages to be dried and smoked are brought in a processing room for three to four days. The sausages are resting on plates, grids or belts during the drying and smoking in the processing room. There is no indication in the text of the French patent that the plates, grids or belts (and thus the sausages) are moved during their stay in the processing room. The problem is to perform the drying of the sausages on a controlled and efficient manner. This problem is solved in the French patent by a special distribution system for heated and smoked air in the processing room.

The German patent publication DE 1 023 308 describes a smoke wagon with pivotally suspended smoke bars. Sausages are suspended from the smoke bars, which are connected to endless conveyors, such that the sausages can be displaced during the smoking. Driving of the endless conveyors is only possible during the stay of the smoke wagon in the smokehouse. In contrast to the method and apparatus according to the invention, the apparatus described in this publication is not suitable for prolonged drying of half-finished products for dry sausage, nor for co-extruded half-finished products due to the deforming of the products to a "pear-shape".

In a preferred application of the method the half-finished product is manufactured by means of concentric co-extrusion of a sausage filling and a skin enclosing the sausage filling. A pre-drying treatment is performed following the co-extrusion process. In the known art the co-extrusion process is applied in the manufacture of cooked sausages. The necessary drying takes place either by means of a hot air treatment, or, according to more modern developments, by guiding the co-extruded sausage string, which may or may not be portioned, through an extended salt bath in which for instance the contact times between sausage and salt can be varied. Half-finished products for dry sausages were heretofore generally manufactured by means of filling ("stuffing") natural intestine a preformed skin of collagen or cellulose. Natural intestine is a relatively expensive basic material with dimensions which are not constant. Natural intestine or preformed artificial intestine is filled mechanically with meat dough. The advantage of co-extrusion of meat dough and artificial skin is that the production of dry sausages can be automated to a far-reaching extent with the resulting advantages for the production price and hygiene. Manipulation of the sausages by hand is after all considerably limited or wholly precluded. Furthermore, the ability to control the quality of the produced sausage is hereby also increased. By now making use of the concentric co-extrusion and pre-drying of the half-finished products for the manufacture of the half-finished products, the subsequent necessary drying time is shortened. In combination with other factors resulting from the present invention, this can lead to a shortening of the drying time of up to 50% relative to the prior art. It is also advantageous that the method according to the invention can be performed as a continuous operation instead of the discrete processing operation of stuffing according to the prior art. Use can advantageously be made herein of production lines manufactured by applicant for automated production of cooked sausages. In these production lines the co-extrusion unit is rigidly coupled to the subsequent processing station for the purpose of pre-drying.

The half-finished products are preferably placed in product carriers during the drying. It is also recommended that the half-finished products are situated in a substantially horizontal position during the second drying. Deforming of the half-finished products during the second drying can thus be prevented. An advantage of the second drying the half-finished products in substantially horizontal position is also that the surface situated on the underside, where the most evaporation takes place due to gravitational release of water, is relatively large.

In another preferred application of the method the second drying treatment is out of line with the preceding production steps A and B. The second drying is such a lengthy treatment that it is not practical to link this rigidly to the initial phase of the continuous sausage production. For the purpose of separation the co-extruded half-finished products are preferably transferred after pre-drying from a transport system which can be coupled to a co-extruder to a subsequent transport system. Such a transfer can be performed automatically in simple manner. By means of the method according to the invention the co-extruded sausage, after a number of processes performed in line, can be taken out of the line in order to be placed in a climate room. The initial phase of the existing co-extrusion production lines can hereby also be employed for the production of dry sausages. A significant economic advantage is that the options for use of an expensive co-extrusion production line hereby increase, which reduces the time in which the cost of such a line is recovered. It is moreover advantageous if the half-finished products are transferred to a transport system so that the sausages can be automatically moved and further processed.

A division of the extruded half-finished product into separate parts preferably takes place between co-extrusion of the half-finished product in continuous manner and the drying. The separated half-finished products can hereby be removed from the continuous production process for "batch"-like further processing. This division preferably takes place between the co-extrusion and the pre-drying because the half-finished products are hereby more readily manageable, and therefore controllable, than when they are still mutually connected in the form of a string.

In another preferred application of the method the half-finished products are transferred to a subsequent stationary transport system. Such a stationary transport system carries the half-finished products through a conditioned environment so that the subsequent second drying is realized in a relatively short period of time. The advantage of a stationary transport system is that the operations required for the second drying are minimal: only the subsequent transport system has to be advanced after transfer.

As an alternative to a stationary transport system, the half-finished products can be transferred to a subsequent transport system with displaceable product carriers. The subsequent transport system is preferably displaceable as a whole between a loading/unloading position and at least one treatment space. The product carriers have the advantage that the lay-out of a production area is more flexible; the location of a treatment space can for instance be situated at a distance from the production line. It is also more easily possible to employ the treatment spaces for other purposes when they are not filled with one or more product carriers.

The half-finished products are preferably moved during the second drying such that the contact surfaces on which the half-finished products support are changed. This can be realized during displacement or change of orientation of the half-finished products, but can also take place independently hereof. The chance of undesired deformation of the half-finished products on the contact surfaces is thus limited. Another advantage here is that the danger of undesired fungal growth at the contact locations is reduced. It is also noted here that in the suspended second drying of the prior art the chance of fungal growth is present where sausage strings come into mutual contact. With the method according to the invention the position of the half-finished products during the second drying can be more readily controlled, so that the chance of undesired contact between half-finished products for drying is very small.

In yet another preferred application of the method the sausages are transferred after the second drying to a conveyor for final processing in a continuous manner. The last part of the production process, which can for instance comprise packaging, can therefore also be performed with a minimal manpower requirement.

The invention furthermore provides an apparatus for manufacturing dry sausages, as disclosed in the preamble, characterized in that, the apparatus is an apparatus for manufacturing dry sausages, and that the apparatus also comprises a second drying space for a second drying of the sausages during at least one day and a container for containing a plurality of sausages in the second drying space, with a frame in which at least one endless conveyor is arranged, which conveyor is provided with a plurality of product carriers and wherein the conveyor with product carriers is displaceable relative to the frame. The container of such an apparatus can be loaded and/or unloaded at a fixed position since, when a specific product carrier is filled respectively emptied, the conveyor can be moved further for filling/emptying of a subsequent product carrier. The product carriers, which are preferably adapted to contain sausages in more or less horizontal position, are in addition displaceable by means of the conveyor in order to prevent deformation of the sausages as described above. Half-finished products can be manufactured in efficient manner with a co-extrusion unit, wherein the invention particularly also enables manufacture of half-finished products for dry sausages by means of co-extrusion. Other advantages of the co-extrusion of half-finished products for dry sausages are already described above.

The container of the apparatus can be provided with a drive for the conveyor and/or coupling means for coupling the conveyor to an external drive. It is possible to opt for driving of the conveyor of the container by means of an own or an external power source. It is also possible to combine both drive options in one container, for instance to use an external power source during loading/unloading of the container and to use an own power source in advancing the chain at a distance from a loading/unloading station.

In a preferred embodiment of the container of the apparatus, the product carriers are mounted pivotally on the conveyor. By displacing the conveyor the separate product carriers, for instance baskets, can be set into motion by mass inertia. It is also possible to have the pivotable product containers co-act with at least one stop, whereby the product carriers undergo a forced movement. It is also possible for the container to be adapted to allow passage of at least one external stop for co-action with the pivotable product carriers during unloading of the container. When the container is paced close to a loading/unloading station, an external stop which for instance forms part of the loading/unloading station can thus be employed for the forced displacement of the product carriers. A stop can be displaceable as desired between for instance an active and a non-active position. Alternatively, it is also possible for the displaceable stop to form part of the frame of the container.

In yet another preferred embodiment the frame of the container of the apparatus is embodied as a mobile wagon. Such a container can be readily moved between a loading/unloading station and a processing station such as a climate room.

As alternative to the container embodied as a mobile wagon, a container can also be chosen wherein the frame is combined with the drying space, wherein the transport route is situated wholly in the drying space. In a preferred embodiment the space combined with the frame comprises a closable entrance/exit opening. A stationary disposition of the container has the advantage that no wagon travel is required, which makes it even simpler to mechanize or automate this part of the process as well.

In addition to the apparatus as described above, the invention also individually comprises the container which forms part of the apparatus.

Figure 2:
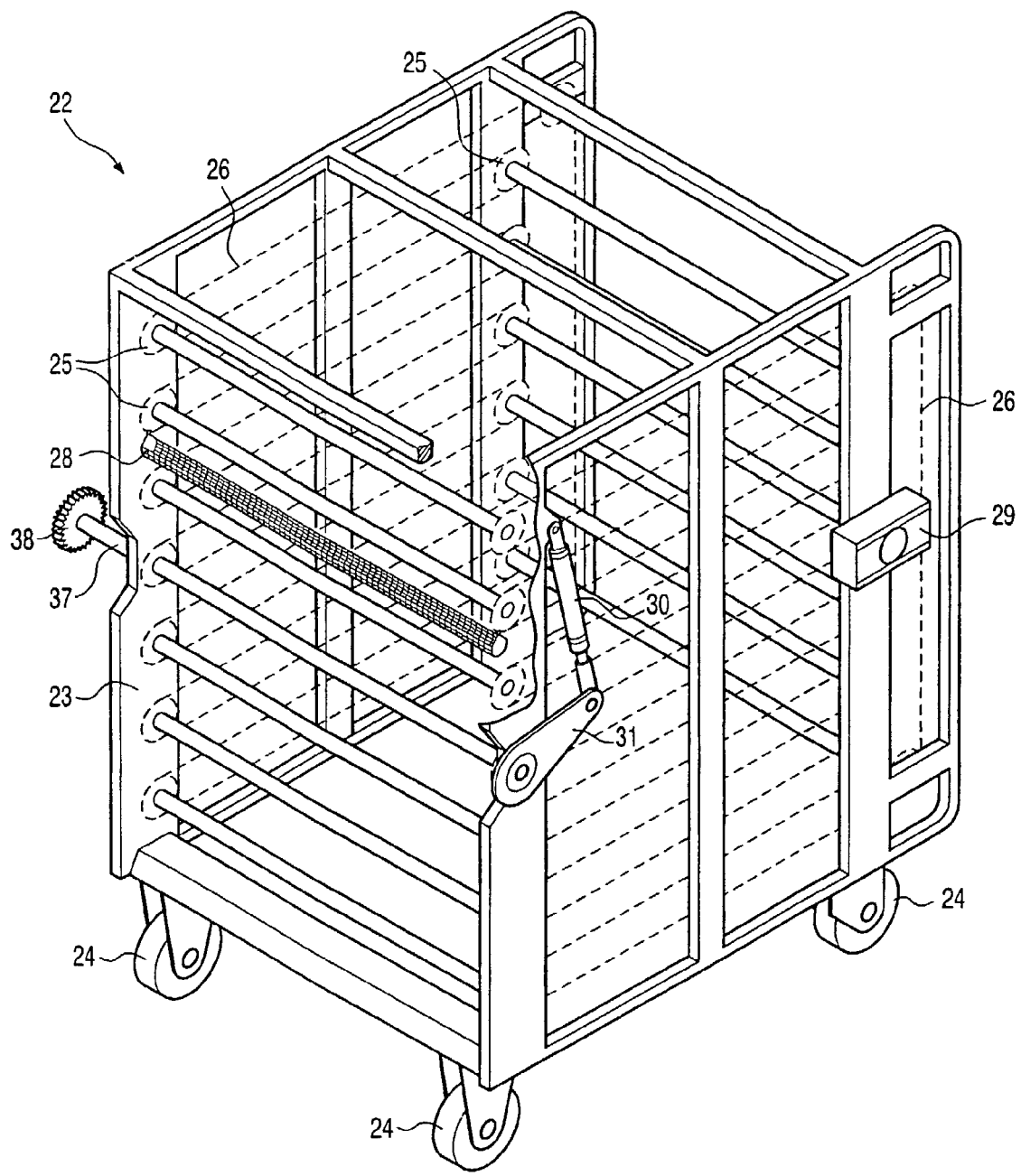
Figure 3:
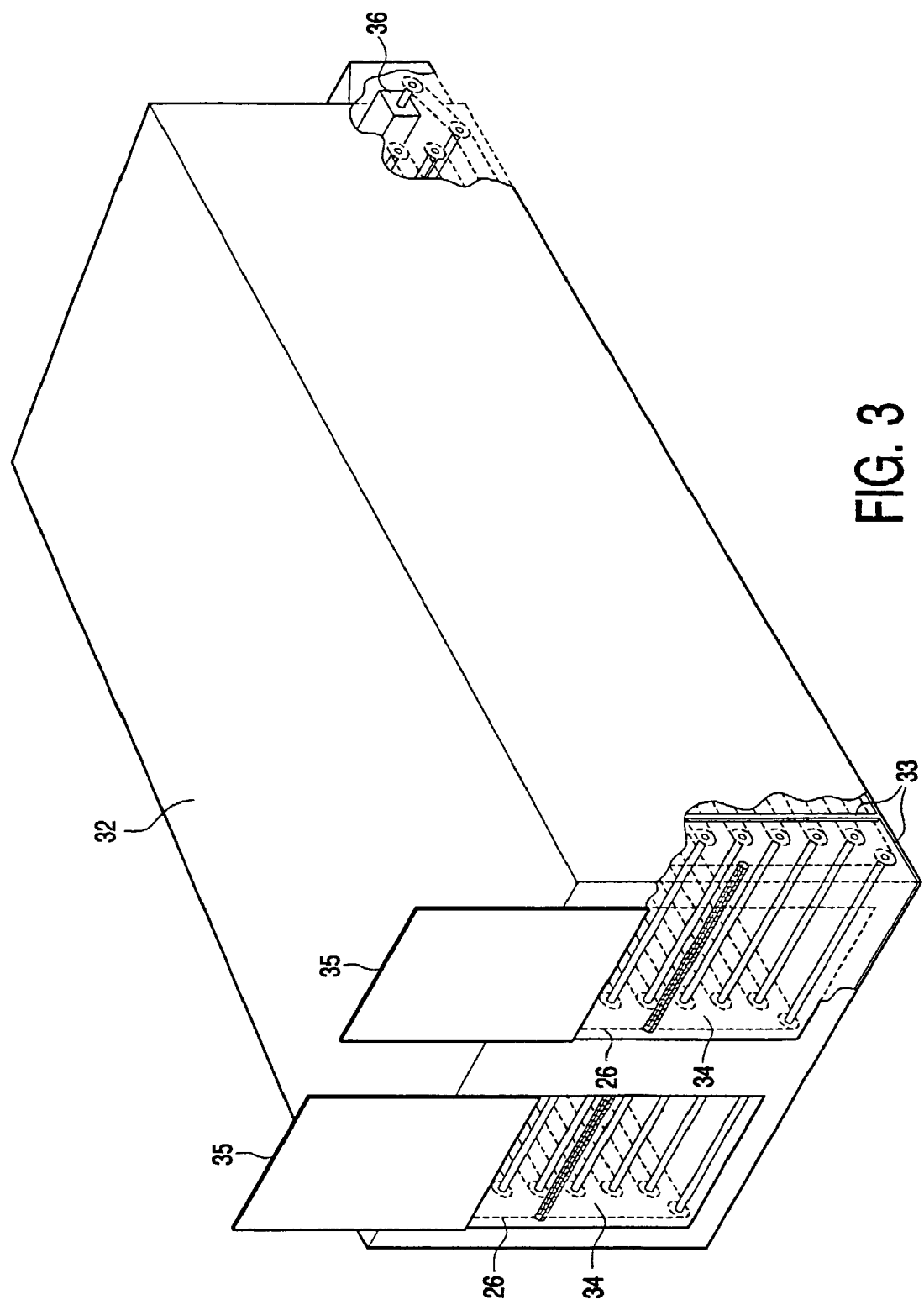

The present invention will be further elucidated with reference to the non-limitative embodiments shown in the following figures. Herein:

FIG. 1 shows a schematic top view of an apparatus for sausage production whereby sausages can be manufactured as desired wholly in line or partly in line and partly batch-wise, FIG. 2 shows a schematic three-dimensional view of a container according to the present invention embodied as a wagon for containing sausages, and FIG. 3 shows a schematic three-dimensional view of a container in stationary form as alternative to the container shown in FIG. 2.

FIG. 1 shows an apparatus 1 in which meat dough is added by means of a pump 2 to a co-extrusion unit 3. At a short distance following co-extrusion unit 3 a first brine bath 4 is arranged for a first stabilization of the collagen skin of the sausage. By means of a crimper 5 the sausage string is divided into sausages of a desired length. The separate sausages are then guided through a tunnel 6 to a pre-drying device 7 in which the sausages stay for a maximum of some tens of minutes. The conveyor rigidly coupled to co-extrusion unit 3 with which the sausages are guided through tunnel 6 and pre-drying device 7 is not shown in this figure but consists for instance of a chain above which baskets are suspended (in accordance with WO 99/13729).

Following on from pre-drying device 7 is situated a smoke device 8 in which the pre-dried half-finished products undergo a (for instance liquid) smoke treatment. The half-finished products coming from smoke device 8 are supplied after pre-drying to packaging machines 10 by means of a conveyor belt 9. The packaged sausages can then be fed to a pasteurizing device 11 with a cooling section 12. The packaged and pasteurized sausages will leave the device along an exit 13.

Up to this point the description of FIG. 1 relates to an existing apparatus whereby cooked sausages are manufactured. Dry sausages cannot be manufactured according to the above described production process since they require drying for considerably longer than some tens of minutes. The drying process for dry sausages requires at least a few days and takes place at relatively low temperatures in order to prevent further cooking of the half-finished product.

Co-extruded dry sausages can now also be produced according to the invention. For this purpose a pump 14 is fed with a suitable meat dough. A co-extrusion unit 15 receives the meat dough which, together with the skin to be extruded, forms a basis for a dry sausage. A crimper 16 divides the co-extruded half-finished product into parts after passage through the first brine bath 4. The separated half-finished products run via a part of tunnel 6 through pre-drying device 7 and past smoke device 8 which is "bypassed", and then fed back underneath to a branched line part 17. This branched line part 17 is provided with loading stations 18. Containers 19 can be connected to loading stations 18 such that the half-finished products can be loaded automatically into containers 19. It is otherwise noted that apparatus 1 contains two extrusion units 3,15 with two associated pumps 2,14, but that this is only one embodiment variant; it is also possible to embody apparatus 1 with only a single extrusion unit 3 or 15 and pump 2 or 14.

When a container 19 is sufficiently loaded it is displaced to one of the climate rooms 20 for drying the half-finished products for a longer period of time. When the treatment in a climate room 20 is completed, container 19 can be displaced to one of the unloading stations 21, which in this figure connect onto conveyor belt 9, so that the dried sausages can be carried over packaging machines 10 and optionally pasteurizing device 11 for the final part of the production process. The integration shown in this figure of a production line for cooked sausage with the means for manufacturing dry sausage can be taken even further. It is thus possible to manufacture both types of sausage with only a single co-extrusion unit 3. It is then desired for this purpose that brine bath 4 can be placed in respectively out of the line depending on the type of sausage which will be manufactured.

FIG. 2 shows a container 19 in the form of a drying wagon 22. A frame 23 of wagon 22 is provided with wheels 24 for a simple displacement of container 19. Combined with frame 23 are reversing wheels 25 along which two transporting chains 26 are displaceable in parallel manner. Pivotable baskets 28 for containing sausages are suspended between transporting chains 26. For the sake of clarity only one basket 28 is drawn in this figure. In reality a great number of baskets 28 are arranged between the opposite chains 26.

Drying wagon 22 is further provided with a protruding shaft part 37 with a toothed wheel 38 mounted thereon with which transporting chains 26 can be displaced in frame 23 using an external power source (not shown). Drying wagon 22 further contains a drive cylinder 30 which engages via lever 31 with ratchet mechanisms on a reversing wheel 25. Using drive cylinder 30 the transport chains 26 can be advanced with a stop-start movement, for instance to prevent half-finished products starting to deform through lying still too long and to ensure that all half-finished products undergo the same drying treatment. It is noted that drying wagon 22 can optionally also be embodied with only a protruding shaft part 37 with toothed wheel 38 mounted thereon or only a drive cylinder 30 instead of both. When a protruding shaft part 37 with a toothed wheel 38 mounted thereon is present as well as a drive cylinder 30, there is free choice in the use of either of the two in both the loading/unloading and in the advancing movement during drying. Drying wagon 22 is provided with chain tensioner 29 for tensioning chains 26.

FIG. 3 shows an alternative for drying wagon 22. A frame 33 is placed in stationary manner in a housing 32 of a climate room. Frame 33 takes a dual form such that twice two transporting chains 26 are accommodated therein. Infeed/outfeed openings 34 in housing 32 are closable with sliding doors 35. Chains 26 are displaceable by means of a stationary drive 36. Baskets 28 with a width of 1 to 1.5 meters are found to work advantageously in practice. The length of chains 26 can amount to several hundred meters in a stationary frame 33, on which chains thousands of baskets 28 are suspended.

Although the invention is described with reference to only a few embodiments, it will be apparent to all that the invention is by no means limited to the described and shown embodiments. On the contrary, many more variations are possible for the skilled person within the scope of the invention.

The invention claimed is:

1. A method for manufacturing sausages by the successive processing steps of: manufacturing a half-finished product which is still to be pre-dried and consists of a skin filled with a sausage filling, and pre-drying the half-finished product, characterized in that, the sausages to be manufactured are dry sausages, the half-finished pre-dried product is dried for a second time during a period of more than one day, and the products are moved, intermittently, during the second drying.

2. The method as claimed in claim 1, characterized in that the products are moved during the second drying such that the orientation changes.

3. The method as claimed in claim 2, characterized in that the products are moved during the second drying such that they are displaced.

4. The method as claimed in claim 1, characterized in that the half-finished product is manufactured by means of concentric co-extrusion of a sausage filling and a skin enclosing the sausage filling, and the pre-drying treatment is subsequently performed.

5. The method as claimed in claim 1, characterized in that the half-finished products are placed in product carriers (28) during the second drying.

6. The method as claimed in claim 1, characterized in that the half-finished products are situated in a substantially horizontal position during the second drying.

7. The method as claimed in claim 4, characterized in that the co-extruded half-finished products are transferred after pre-drying from a transport system (9) coupled to a co-extruder (3, 15) to a subsequent transport system.

8. The method as claimed in claim 4, characterized in that a division of the co-extruded product into separate parts takes place between co-extrusion of the product in continuous manner and the second drying.

9. The method as claimed in claim 8, characterized in that division takes place between the co-extrusion and the pre-drying.

10. The method as claimed in claim 1, characterized in that the half-finished product is transferred to a subsequent stationary transport system (19, 22).

11. The method as claimed in claim 1, characterized in that the half-finished products are transferred to a subsequent transport system (19,22) with displaceable product carriers (28).

12. The method as claimed in claim 11, characterized in that the subsequent transport system (19, 22) is displaceable as a whole between a loading/unloading position (18) and at least one treatment space (20, 32).

13. The method as claimed in claim 1, characterized in that the half-finished products are moved during the second drying such that contact surfaces on which the half-finished products support are changed.

14. The method as claimed in claim 1, characterized in that the half-finished products are transferred after the second drying to a conveyor (26) for final processing in continuous manner.

15. An apparatus (1) for manufacturing: half-finished pre-dried products consisting of a skin filled with a sausage filling comprising a co-extrusion unit (3, 15) and a pre-drying unit (7), characterized in that, the apparatus (1) is an apparatus (1) for manufacturing dry sausages, and that the apparatus (1) also comprises a second drying space (20, 32), for a second drying of the sausages during at least one day and a container (19, 32) with a frame (23, 33) in which at least one endless conveyor (26) is arranged, which conveyor (26) is provided with a plurality of product carriers (28) and wherein the conveyor (28) with product carriers (28) is displaceable relative to the frame (23, 33), wherein the product carriers (28) are mounted pivotally on the conveyor (26), the frame is provided with at least one stop which co-acts with the pivotally suspended product carriers, and further comprises a drive (30) operatively connected to the conveyor (26) to advance the conveyor with a stop-start movement during a drying treatment.

16. An apparatus (1) as claimed in claim 15, characterized in that the product carriers (28) are adapted to contain sausages in more or less horizontal position.

17. An apparatus (1) as claimed in claim 15, characterized in that the container (19) comprises coupling means for coupling the conveyor (26) to an external drive.

18. An apparatus (1) as claimed in claim 15, characterized in that the frame (23, 33) of the container (19) of the apparatus (1) is embodied as a mobile wagon (22).

19. An apparatus (1) as claimed in claim 15, characterized in that the frame (23, 33) is combined with the drying space (32), and a transport route is situated wholly in the second drying space (32).

20. An apparatus (1) as claimed in claim 19, characterized in that the space (32) combined with the frame (23, 33) comprises a closable entrance/exit opening (35).

* * * * *